(12) United States Patent
Faure et al.

(10) Patent No.: US 11,549,170 B2
(45) Date of Patent: Jan. 10, 2023

(54) METHOD FOR OBTAINING A ZIRCONIA-BASED ARTICLE HAVING A METALLIC APPEARANCE

(71) Applicant: The Swatch Group Research and Development Ltd, Marin (CH)

(72) Inventors: Cedric Faure, Cortaillod (CH); Loic Curchod, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/666,886

(22) Filed: Aug. 2, 2017

(65) Prior Publication Data
US 2018/0057923 A1    Mar. 1, 2018

(30) Foreign Application Priority Data
Aug. 26, 2016    (EP) ..................................... 16185922

(51) Int. Cl.
*C23C 8/06* (2006.01)
*C23C 8/80* (2006.01)
(Continued)

(52) U.S. Cl.
CPC ................ *C23C 8/06* (2013.01); *C04B 35/48* (2013.01); *C04B 35/486* (2013.01);
(Continued)

(58) Field of Classification Search
CPC .... C23C 8/02; C23C 8/06; C23C 8/20; C23C 8/24; C23C 8/30; C23C 8/80;
(Continued)

(56) References Cited

U.S. PATENT DOCUMENTS

| | | | | |
|---|---|---|---|---|
| 2,453,118 A | * | 11/1948 | Buckingham | ........... H01J 17/52 313/46 |
| 2,461,019 A | * | 2/1949 | Alexander | ............ C01B 21/076 423/411 |

(Continued)

FOREIGN PATENT DOCUMENTS

| | | |
|---|---|---|
| EP | 0 947 486 A1 | 10/1999 |
| EP | 0 947 490 A1 | 10/1999 |

(Continued)

OTHER PUBLICATIONS

English abstractor SE 455195 B by Silikatforskning et al., published Jun. 27, 1988; abstract from Espacenet.*

(Continued)

*Primary Examiner* — Dah-Wei D. Yuan
*Assistant Examiner* — Nga Leung V Law
(74) *Attorney, Agent, or Firm* — Oblon, McClelland, Maier & Neustadt, L.L.P.

(57) ABSTRACT

The present invention concerns a method for obtaining a finished or semi-finished zirconia-based article, the surface of the article having a metallic external appearance and non-zero surface electrical conductivity, wherein the method includes the steps of:

taking at least one zirconia article, pre-shaped in its finished or semi-finished form;

placing said article in a chamber in which a hydrogen and carbon/nitrogen gas mixture is heated;

heating said article and the gas mixture using at least one resistive element traversed by an electric current to obtain dissociation of the hydrogen and carbon/nitrogen based gas molecules and an increase in the temperature of said article;

(Continued)

keeping said article in the reactive atmosphere thus created to obtain diffusion of the carbon/nitrogen atoms in the external surface of said article.

12 Claims, 1 Drawing Sheet

(51) Int. Cl.
*G04B 37/22* (2006.01)
*C04B 41/00* (2006.01)
*C04B 35/48* (2006.01)
*C04B 41/50* (2006.01)
*G04B 45/00* (2006.01)
*C04B 41/45* (2006.01)
*C04B 41/87* (2006.01)
*C04B 35/486* (2006.01)

(52) U.S. Cl.
CPC ........ *C04B 41/009* (2013.01); *C04B 41/4529* (2013.01); *C04B 41/5057* (2013.01); *C04B 41/5062* (2013.01); *C04B 41/87* (2013.01); *C23C 8/80* (2013.01); *G04B 37/225* (2013.01); *G04B 37/226* (2013.01); *G04B 45/0076* (2013.01); *C04B 2235/765* (2013.01)

(58) Field of Classification Search
CPC .............. C04B 41/009; C04B 41/4519; C04B 41/4529; C04B 41/4556; C04B 41/5062; C04B 41/5057; C04B 41/87; C04B 35/48; C04B 35/486; C04B 2235/765; C04B 35/622; C04B 35/64; C04B 2235/3839; C04B 2235/3886; C04B 2235/666; C04B 2235/656; C04B 2235/6567; C04B 2235/6582; C04B 2235/614; C04B 2235/96; C04B 2235/9646; C04B 2235/9661; G04B 37/226; G04B 45/0076; G04B 37/225
USPC ........ 427/542, 545, 546, 593; 264/431, 434, 264/486, 487
See application file for complete search history.

(56) References Cited

U.S. PATENT DOCUMENTS

| | | | | |
|---|---|---|---|---|
| 2,686,117 A | * | 8/1954 | Wulff | C22C 1/053 419/14 |
| 2,916,535 A | * | 12/1959 | Marden | H05B 3/62 219/390 |
| 3,325,666 A | * | 6/1967 | Bird | H01K 1/26 313/113 |
| 3,740,340 A | * | 6/1973 | Riley et al. | C04B 35/488 252/62 |
| 4,490,319 A | * | 12/1984 | Lee | C04B 35/111 264/325 |
| 5,080,975 A | * | 1/1992 | Komaki | C04B 41/009 423/446 |
| 5,690,887 A | | 11/1997 | Magnin | |
| 5,871,850 A | * | 2/1999 | Moriguchi | C23C 28/04 428/651 |
| 6,355,202 B2 | * | 3/2002 | Verdon | A44C 27/001 264/430 |
| 6,360,423 B1 | * | 3/2002 | Groll | A47J 36/02 220/573.1 |
| 2002/0060506 A1 | * | 5/2002 | Kuhlmann-Wilsdorf | H01H 1/06 310/219 |
| 2004/0142213 A1 | * | 7/2004 | Chen | B44C 3/02 428/701 |
| 2009/0023274 A1 | * | 1/2009 | Cao | C23C 16/50 438/478 |
| 2009/0223452 A1 | * | 9/2009 | Nasman | C23C 16/4557 118/724 |
| 2010/0136767 A1 | * | 6/2010 | Hwang | H01L 21/02527 438/468 |
| 2010/0166512 A1 | * | 7/2010 | Tanibuchi | C23C 16/34 407/119 |
| 2013/0251608 A1 | * | 9/2013 | Chun | B32B 18/00 422/619 |
| 2019/0004481 A1 | * | 1/2019 | Curchod | C04B 41/009 |
| 2019/0202748 A1 | * | 7/2019 | Faure | C04B 41/009 |

FOREIGN PATENT DOCUMENTS

| | | | | |
|---|---|---|---|---|
| JP | 01-257181 A | * | 10/1989 | ............ C04B 41/87 |
| KR | 2009-0067289 A | * | 6/2009 | ............ C23C 14/18 |
| SE | 455 195 | | 6/1988 | |

OTHER PUBLICATIONS

Machine translation (from Espacenet) of EP 0947486 A1 by Beatrice et al., published Oct. 6, 1999 (in 3 parts abstract; specification & claims).*

Robert C Weast, PhD, editor; CRC Handbook of Chemistry and Physics, 56th edition; CRC press; Cleveland, Ohio; 1975 (no month); excerpts pp. D-56, F-93 & F-113 to F-114.*

Formal Translation of SE 455195 B, by Tjernlund et al., document publication date Jun. 27, 1988.*

John H. Parry et al., editor; Chemical Engineers' Handbook; 4th edition; McGraw-Hill book Company, Inc., New York; 1963 (no month); excerpt pp. 25-41 to 25-43.*

European Search Report dated Feb. 3, 2017 in European Application 16185922.8, filed on Aug. 26, 2016 (with English Translation of Categories of cited documents).

* cited by examiner

METHOD FOR OBTAINING A ZIRCONIA-BASED ARTICLE HAVING A METALLIC APPEARANCE

This application claims priority from European patent application No. 16185922.8 filed Aug. 26, 2016, the entire disclosure of which is hereby incorporated herein by reference.

The present invention concerns a zirconia-based article, especially a sintered article, and in particular one whose chemical structure is transformed on part of its thickness to give the article an external surface having a metallic appearance and non-zero electrical conductivity. The invention also concerns a use of such an article as an external element of an article such as a wristwatch, a piece of jewellery or any other article for the luxury industry that may use this type of product, in particular for making structural elements of watch cases or bracelets. The present invention finally concerns a method for obtaining such an article.

PRIOR ART

Among all known materials, metals are very widely used because of certain very advantageous properties: high mechanical resistance, high tenacity, electrical conductivity, etc. Further, their characteristic lustre is very sought after for decorative applications. The hardness of metals is, however, lower than that of ceramics, which may result in significant wear and corrosion in numerous common conditions of use, for example when these materials are used to make external timepiece elements, such as watch cases or wristbands.

There are known methods for shaping and polishing ceramics to obtain external elements whose hardness and resistance to wear and t corrosion are considerably higher than those of metals.

There is a known method for modifying a zirconia-based ceramic ($ZrO_2$) part of this type in order to give it metallic properties, including a grey colour and brilliance close to that of platinum and non-zero surface conductivity, while maintaining a higher hardness and resistance to wear and to corrosion than that of metals. This method makes it possible to obtain a finished or semi-finished zirconia article having a partially reduced $ZrO_2$ core and a metallic external appearance. It includes the steps consisting of:
- taking at least one zirconia article, pre-shaped in its finished or semi-finished form;
- placing said article inside a chamber in which a plasma is created from a mixture of hydrogen, a neutral gas, and traces of carbon, and
- maintaining said article near to the plasma for a time period of around 15 to 240 minutes, the mean temperature of the article settling in these conditions between around 600 and 1,300° C., to obtain a diffusion of carbon atoms in said article.

Such a method therefore makes it possible to produce a zirconia part having an outer layer of zirconium carbide ZrC with a metallic appearance and properties, i.e. a brilliant and conductive surface, while keeping its advantageous properties in comparison to a metal part.

Thus, advantageously in comparison to deposition methods for thin decorative films of metallic appearance by PVD or CVD or other deposition methods, the external layer of metallic appearance produced by this carbiding method is integral with the core of the part, resulting in perfect adhesion of the layer with no risk of delamination.

Finally, this method makes it possible to obtain finished or semi-finished parts with the advantageous properties of zirconium carbide ZrC on the surface without having to produce solid ZrC parts, which would require high temperature sintering methods, possibly under pressure. Also, ZrC is more than 10% denser than $ZrO_2$, so that $ZrO_2$ parts carbided by the aforementioned method are lighter than parts of the same geometry made of solid ZrC. Finally, since ZrC is much harder (typically 25 GPa) than $ZrO_2$ (typically 13 GPa), solid ZrC parts would be much harder to machine and polish after sintering than the same parts made of $ZrO_2$. The aforementioned method overcomes these problems, particularly by making it possible to postpone transformation of the surface of the ZrC part until after the machining and polishing of the $ZrO_2$ part.

This method can be adapted to obtain a layer of zirconium nitride that also has a metallic appearance, non-zero conductivity and perfect adhesion, but is yellow in colour, close to gold. To achieve this, the plasma is obtained from a mixture of hydrogen, a neutral gas and traces of nitrogen.

However, the plasma methods used have the drawback of producing soot. This soot is considered to be dirty and abrasive since it is made of particles from the plasma treatment. Such particles may be harmful to zirconia parts during the handling of said parts on which soot is deposited.

SUMMARY OF THE INVENTION

It is an object of the invention to overcome the drawbacks of the prior art by providing a method for obtaining an article made of zirconia allowing the formation of layers of zirconium carbide or nitride on the thickness of its surface with the same aesthetic, electrical, and mechanical and chemical resistance properties as layers obtained by a plasma method, but without forming abrasive soot.

To this end, the invention concerns a method for obtaining a finished or semi-finished zirconia-based article, the article having a metallic external appearance and non-zero surface electrical conductivity, characterized in that it includes the steps of:
- taking at least one zirconia article, pre-shaped in its finished or semi-finished form;
- placing said article in a chamber in which a gas mixture made of hydrogen and of carbon/nitrogen is heated by at least one resistive element, for example at least one filament, made of refractory metal and traversed by an electrical current, and
- heating the gas mixture to obtain dissociation of the molecules of hydrogen and carbon or nitrogen based gases and keeping said article inside the chamber containing the heated gases to heat the article and obtain a diffusion of carbon/nitrogen atoms in said article.

The method according to the invention advantageously uses heating means which prevent the formation of soot which could result in scratches during the handling of the treated articles.

In a first advantageous embodiment, the method further includes, during the step of heating the gases contained inside the chamber and then during the actual carbiding/nitriding treatment step, a diffusion towards the surface and release of the oxygen contained in said zirconia article.

In a second advantageous embodiment, the method further includes, prior to the step of heating the gases contained inside the chamber, a reduction step consisting in placing said article inside a secondary chamber into which dihydrogen is injected and in heating the dihydrogen and the article placed inside the chamber, thus allowing dissociation of the dihydrogen and diffusion towards the surface and release of the oxygen contained in said zirconia article.

In a third advantageous embodiment, the thickness of the layer transformed on the outer surface of said article is comprised between around 10 and 1,000 nm.

In a fourth advantageous embodiment, the thickness of the outer surface is comprised between 20 and 200 nm.

In a fifth advantageous embodiment, said at least one resistive element is made of a refractory metal selected from the list including niobium, molybdenum, tantalum, tungsten and rhenium.

In a sixth advantageous embodiment, said at least one resistive element made of refractory metal is a filament.

In a seventh advantageous embodiment, said chamber includes a single resistive element arranged inside the chamber for heating the process gases and the articles to be treated in a homogeneous manner.

In an eighth advantageous embodiment, said chamber includes a plurality of resistive elements distributed inside the chamber for heating the process gases and the articles to be treated in a homogeneous manner.

In a ninth advantageous embodiment, at least one of the process gases is injected via the resistive elements heated by the electrical current passing therethrough and which then include in their volume a network of pipes for said process gas flow, instead of being injected around said resistive elements via a dedicated injection system, in order to increase the dissociation efficiency of said process gas and take advantage of the configuration of resistive elements inside the chamber to ensure that the distribution of said reactive gas injection results in a homogeneous method over all the articles.

In a tenth embodiment, at least one of the process gases is separately dissociated by any means known to those skilled in the art before being injected into the main chamber to be mixed with the other process gases to produce the reactive atmosphere required for the method.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which.

DETAILED DESCRIPTION

Figure 1:
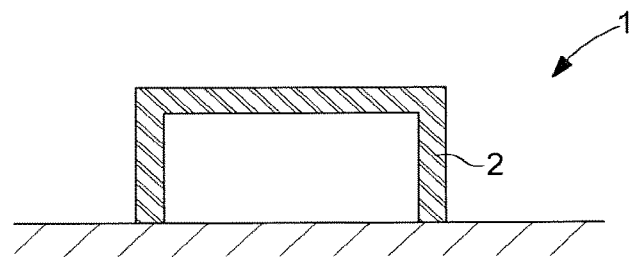
FIG. 1 schematically represents the article according to the invention.

By way of example in FIG. 1, there is provided a starting object formed by a zirconia article 1 having a tetragonal crystallographic configuration (zirconium oxide, $ZrO_2$), white in colour and which is produced by the usual manufacturing techniques for ceramic articles, for example by sintering.

This article may be a finished product having the final shape in which it will be used, for example a part of generally parallelepiped shape which has already been mirror polished and is intended to form an external element of a watch, for example a watchband link. Of course, if required, the article may be a semi-finished product on which subsequent machining operations could be performed to adapt the article to its final use. Article 1 could be a part of a watch or of a piece of jewellery or of any article related to the luxury industry that may use this type of external element.

Figure 2:
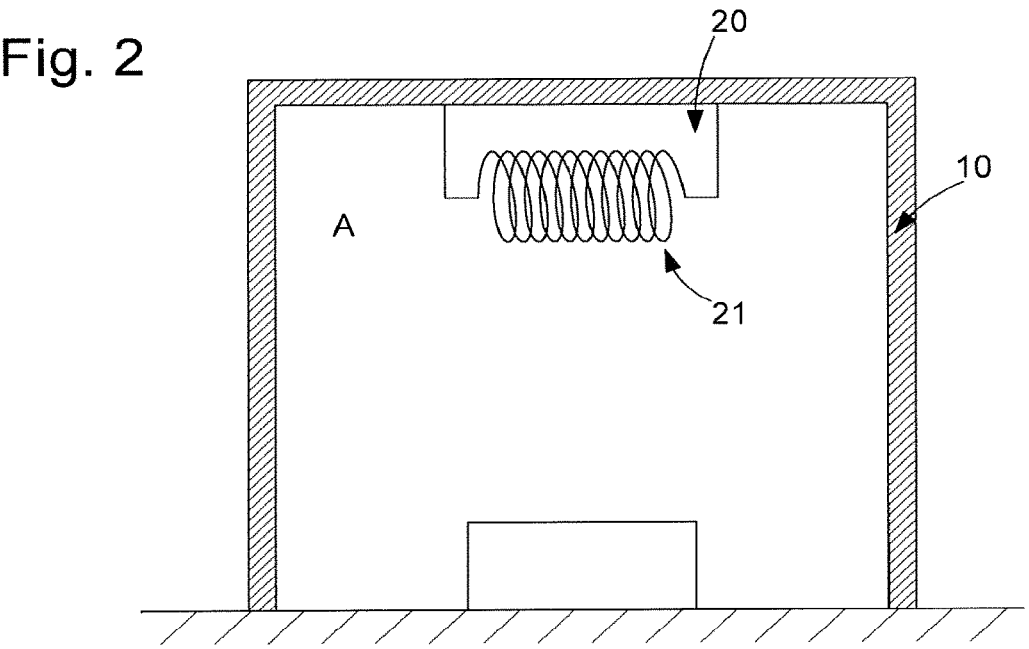
FIG. 2 schematically represents the chamber for performing the method according to the invention.

This article is then introduced into a chamber 10 inside which it will be treated as seen in FIG. 2. The treatment that will be applied is a carbiding or nitriding treatment. An essential feature of the method is that it involves transformation of the surface of the article over a small thickness, on the order of 10 to 1,000 nm, wherein the zirconia (zirconium oxide) in the outer area 2 seen in FIG. 1 is transformed into zirconium carbide/nitride having a metallic appearance. There is therefore a surface modification of the zirconia structure into a new crystallographic structure corresponding to that of zirconium carbide/nitride and not an added coating capable of being removed or detached from the surface of the article, particularly when the latter is subjected to high wear conditions. More particularly, outer area 2 of the surface layer, which has the zirconium carbide/nitride structure, extends from the surface to a depth comprised between 20 and 200 nm.

In order to perform a carbiding or nitriding treatment, chamber 10 must contain a gas-filled atmosphere A containing hydrogen and carbon or nitrogen and be provided with heating means 20, these heating means making it possible to activate the treatment.

Figure 3:
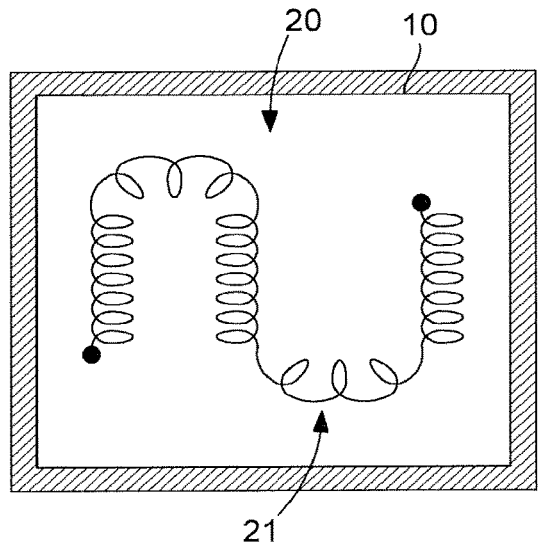
FIGS. 3 and 4 schematically represent filament arrangements inside the chamber according to the invention.
Figure 4:
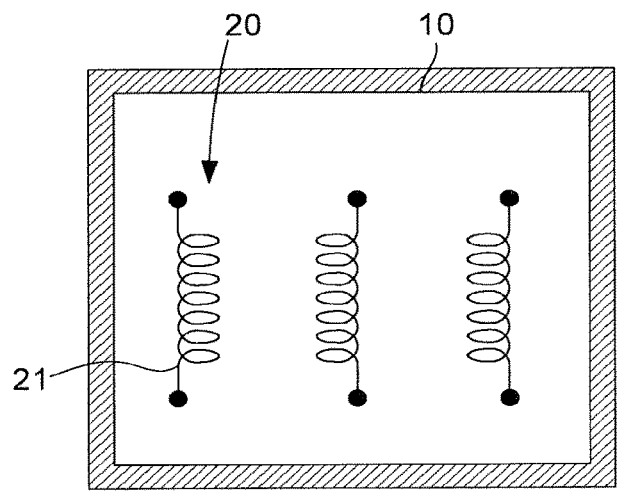

According to the invention, the heating means include at least one resistive element. In a first embodiment, this resistive element is a filament 21 made of refractory metal. This refractory metal is selected from the list including niobium, molybdenum, tantalum, tungsten and rhenium. In fact, heating means 20 may comprise a single filament 21, of large size, arranged inside said chamber for heating the process gases and the articles to be treated in a homogeneous manner, or a plurality of independent filaments arranged to ensure a homogeneous distribution of heat, as seen in FIGS. 3 and 4 respectively.

The filament or filaments are traversed by an electric current, causing an increase in the temperature of the filaments by the Joule effect. This temperature increase is ideally arranged to reach a temperature of the filament or filaments of more than 1500° C.

The temperature increase in the atmosphere inside the chamber allows treatment of the zirconia article to occur. Indeed, this temperature increase in the atmosphere inside the chamber results in dissociation of the gases, so that the atoms of hydrogen H and of carbon C or of nitrogen N are free, and an increase in the temperature of the zirconia part. Under the effect of heat and hydrogen atmosphere, part of the oxygen contained in the zirconia diffuses towards the surface and is released from the zirconia.

This partial zirconia reduction by diffusion of part of its oxygen towards its surface is concomitant with diffusion of carbon or nitrogen atoms from the surface towards the core of the article. Indeed, under the effect of heat, the carbon or nitrogen atoms dissociated from the chamber gas mixture will diffuse in the partially reduced zirconia. This diffusion of carbon or nitrogen atoms results in the appearance of a surface layer of these atoms combined with the partially reduced zirconia to obtain a layer of zirconium carbide or of zirconium nitride.

According to a feature of the article according to the invention, the surface layer includes a transition area located between the partially reduced zirconia core and the outer carbided/nitrided area, said transition area including zirconium oxycarbides/oxynitrides. It is therefore noted that the chemical composition of the surface layer varies as a function of depth measured from the surface of the article and changes continuously from stoichiometric zirconium carbide/nitride (ZrC/ZrN) at the surface to a transition area including zirconium oxycarbides/oxynitrides, then finally to the core of the sub-stoichiometric zirconium oxide (reduced zirconia) part.

According to another preferred feature of the invention, the carbon/nitrogen content of the zirconium oxycarbides/oxynitrides in the transition area decreases with depth, while their oxygen content increases with depth. The transition area thus includes zirconium oxycarbides/oxynitrides whose carbon/nitrogen content gradually decreases towards the core of the article, while the presence of oxygen increases gradually in the form of $ZrO_xC_y/ZrO_xN_y$) type compounds and gradually reaches the core of the article which is essentially formed of partially reduced zirconia of the $ZrO_{2-x}$ type. It will of course be understood that the transition between these various areas occurs gradually.

The articles obtained by this method acquire some novel properties, particularly non-zero surface electrical conductivity, a colour close to platinum (carbiding) or yellow gold (nitriding) and a metallic shine, while maintaining the properties of ceramics, in particular their very high hardness and resistance to wear and corrosion.

This use of resistive elements heated by an electric current has the advantage of not producing soot like the plasma method. The soot produced using the plasma method is dirty and abrasive so that handling the soot covered article can result in scratches appearing on said article.

In a second embodiment, the resistive element or elements take the form of pipes made of a resistive material, in which at least one of the gases used in the method flows, the remainder of the gases used in the method can be injected by a second distribution system. When the pipe is traversed by an electric current, it starts to heat the atmosphere in the chamber and said at least one process gas flowing into said pipe. Openings in said pipe allow said process gas to be released/injected into the chamber.

This second embodiment makes it possible to increase the dissociation efficiency of the gas or gases used in the method and to take advantage of the configuration of resistive elements inside the chamber to ensure that distribution of the injection of the reactive gas results in a homogeneous method over the entire load. In a variant, a preliminary zirconia reduction step may be provided. This reduction step is performed before the carbiding/nitriding step and consists in placing said article in an atmosphere chamber into which dihydrogen $H_2$ is injected. The atmosphere in the chamber is heated so that the article exhibits a temperature increase causing a diffusion of the oxygen contained in the zirconia towards its surface to leave the zirconia.

This reduction step can be performed in a specific chamber or in the same chamber as the carbiding/nitriding operation. In that case, the chamber includes means for modifying the nature of the atmosphere inside said chamber.

It will be clear that various alterations and/or improvements and/or combinations evident to those skilled in the art may be made to the various embodiments of the invention set out above without departing from the scope of the invention defined by the annexed claims.

What is claimed is:

1. A method for obtaining a finished or semi-finished zirconia-based article, the finished or semi-finished zirconia-based article having a metallic external appearance and non-zero surface electrical conductivity, wherein the method comprises:
   placing a zirconia article, pre-shaped in a finished or semi-finished form, in a primary chamber in which a gas mixture of process gases made of hydrogen and carbon-based gas molecules is heated by a resistive element, wherein the resistive element is made of a conductive material and is traversed by an electrical current, to reach a temperature of more than 1500° C.; and
   heating the gas mixture in the primary chamber to obtain dissociation of the hydrogen and carbon-based gas molecules, which heats the zirconia article and obtains a diffusion of carbon atoms in an external surface of the zirconia article towards a core of the zirconia article to form a transformed layer on the external surface, to produce the finished or semi-finished zirconia-based article,
   wherein prior to the heating of the gas mixture in the primary chamber, the method comprises a reduction step consisting of placing the zirconia article inside a secondary chamber into which dihydrogen is injected and heating the dihydrogen allowing diffusion of oxygen towards the surface and release of part of the oxygen contained in the zirconia article.

2. The method according to claim 1, wherein the method further comprises, during the heating of the gas mixture contained in the primary chamber, a further diffusion of oxygen towards the surface and further release of oxygen contained in the zirconia article.

3. The method according to claim 1, wherein a thickness of the transformed layer on the external surface of the finished or semi-finished zirconia-based article is between 10 and 1,000 nm.

4. The method according to claim 3, wherein the thickness of the transformed layer on the external surface of the finished or semi-finished zirconia-based article is between 20 and 200 nm.

5. The method according to claim 1, wherein said resistive element is made of a refractory metal selected from the group consisting of niobium, molybdenum, tantalum, tungsten and rhenium.

6. The method according to claim 1, wherein the resistive element is a filament.

7. The method according to claim 1, wherein the primary chamber comprises only one of the resistive element which is arranged inside the primary chamber for heating the gas mixture and the zirconia article to be treated so as to carbide the zirconia article in a homogeneous manner.

8. The method according to claim 1, wherein the primary chamber comprises a plurality of the resistive elements distributed inside the primary chamber for heating the gas mixture and the zirconia article to be treated so as to carbide the zirconia article in a homogeneous manner.

9. The method according to claim 1, wherein at least one of the process gases of the hydrogen and carbon-based gas molecules of the gas mixture is injected via the resistive element heated by the electric current passing therethrough.

10. The method according to claim 1, wherein the method further comprises, during the heating of the gas mixture contained in the primary chamber, a further diffusion of oxygen towards the surface and further release of oxygen contained in the zirconia article,
   wherein
   a thickness of the transformed layer on the external surface of the finished or semi-finished zirconia-based article is between 20 and 200 nm,
   said resistive element is made of a refractory metal selected from the group consisting of niobium, molybdenum, tantalum, tungsten and rhenium, and the chamber comprises only one of the resistive element which is arranged inside the primary chamber for heating the gas mixture and the at least one zirconia article to be treated so as to carbide the at least one zirconia article in a homogeneous manner.

11. A method for obtaining a finished or semi-finished zirconia-based article, the finished or semi-finished zirconia-based article having a metallic external appearance and non-zero surface electrical conductivity, wherein the method consists essentially of:

placing a zirconia article, pre-shaped in a finished or semi-finished form, in a primary chamber in which a gas mixture of process gases made of hydrogen and carbon-based gas molecules is heated by a resistive element, wherein the resistive element is made of a conductive material and is traversed by an electrical current; and heating the gas mixture in the primary chamber to obtain dissociation of the hydrogen and carbon-based gas molecules, which heats the zirconia article and obtains a diffusion of carbon atoms in an external surface of the zirconia article towards a core of the zirconia article to form a transformed layer on the external surface and a further diffusion of oxygen towards the surface and further release of oxygen contained in the zirconia article, to produce the finished or semi-finished zirconia-based article, wherein prior to the heating of the gas mixture in the primary chamber, the method comprises a reduction step consisting of placing the zirconia article inside a secondary chamber into which dihydrogen is injected and heating the dihydrogen allowing diffusion of oxygen towards the surface and release of part of the oxygen contained in the zirconia article.

12. A method for obtaining a finished or semi-finished zirconia-based article, the finished or semi-finished zirconia-based article having a metallic external appearance and non-zero surface electrical conductivity, wherein the method consists of:

placing a zirconia article, pre-shaped in a finished or semi-finished form, in a primary chamber in which a gas mixture of process gases made of hydrogen and carbon-based gas molecules is heated by a resistive element, wherein the resistive element is made of a conductive material and is traversed by an electrical current, to reach a temperature of more than 1500° C.; and heating the gas mixture in the primary chamber to obtain dissociation of the hydrogen and carbon-based gas molecules, which heats the zirconia article and obtains a diffusion of carbon atoms in an external surface of the zirconia article towards a core of the zirconia article to form a transformed layer on the external surface and a further diffusion of oxygen towards the surface and further release of oxygen contained in the zirconia article, to produce the finished or semi-finished zirconia-based article, wherein prior to the heating of the gas mixture in the primary chamber, the method comprises a reduction step consisting of placing the zirconia article inside a secondary chamber into which dihydrogen is injected and heating the dihydrogen allowing diffusion of oxygen towards the surface and release of part of the oxygen contained in the zirconia article.

* * * * *